INVENTOR
MARTIN BEKEDAM
BY
Munn & Liddy
ATTORNEYS

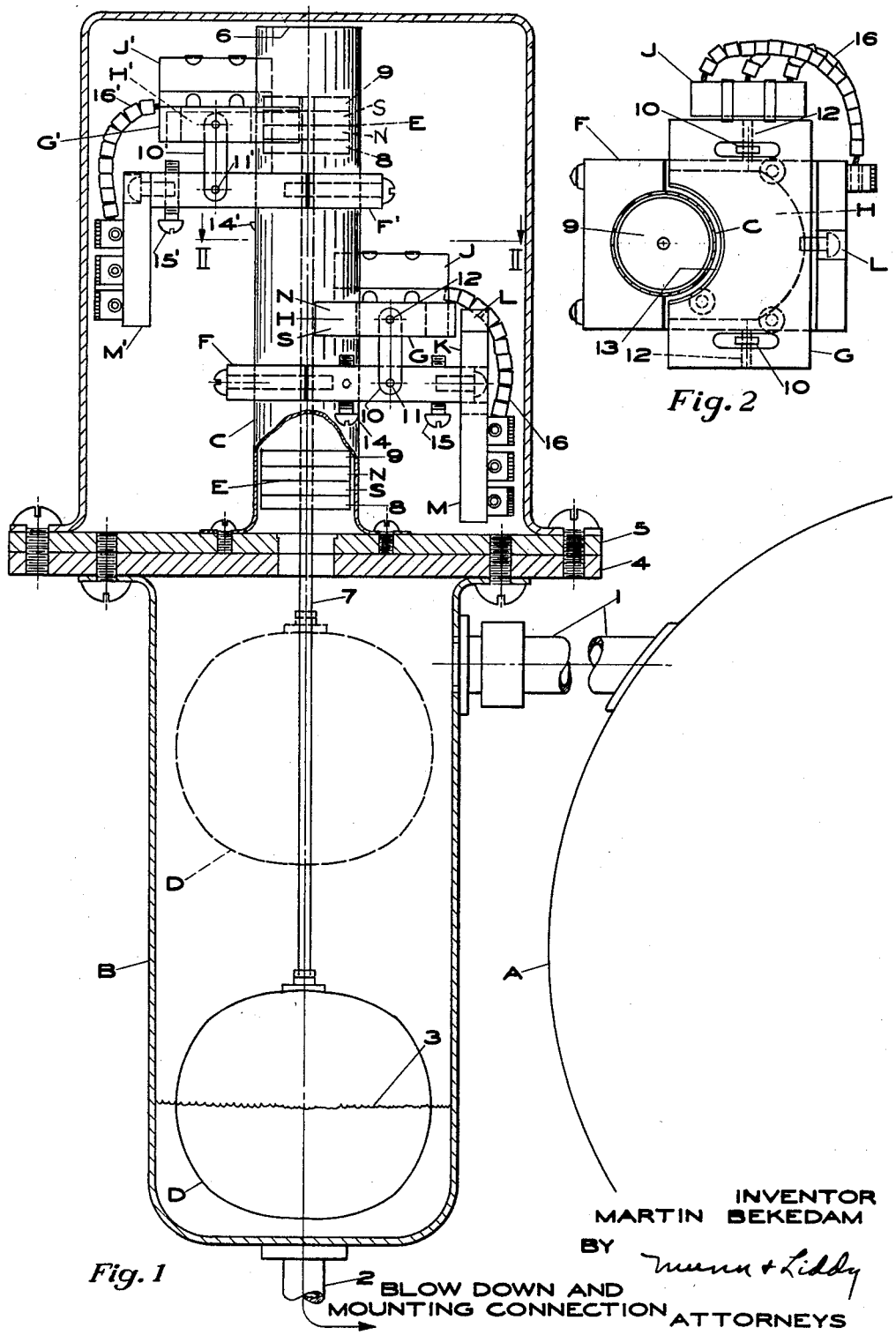

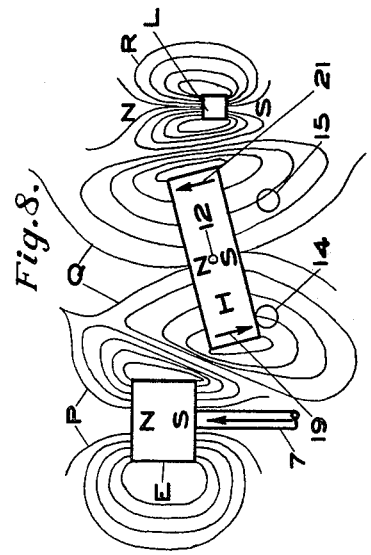
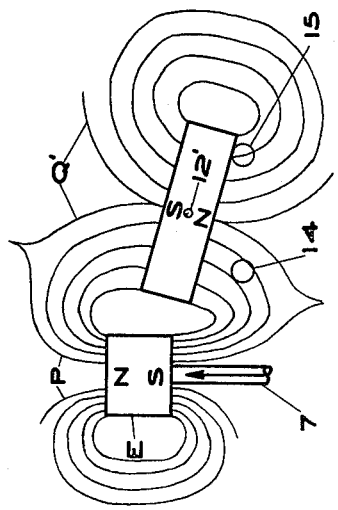
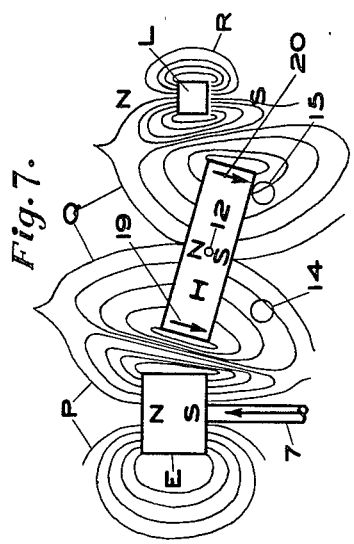
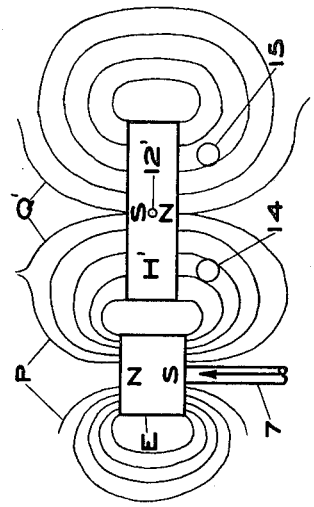

United States Patent Office 3,167,694
Patented Jan. 26, 1965

3,167,694
PERMANENT MAGNET SENSING ELEMENT OF LIMITED ROTATION OPERATING SNAP ACTION ELECTRIC SWITCHES
Martin Bekedam, 9 Northwood Court, Orinda, Calif.
Filed Mar. 6, 1961, Ser. No. 93,514
4 Claims. (Cl. 317—201)

The present invention is an improvement over the form of the invention shown in my copending application on a Magnetic Sensing Element and Tracking Pilot Actuators, Serial No. 782,185, filed December 22, 1958, now abandoned.

In the abandoned case, I disclose a sensing magnet movable in a non-magnetic tube that is vertically arranged. A float has a vertical rod that is connected to the sensing magnet and a variation in the liquid level would raise or lower the float which in turn would raise or lower the sensing magnet. The sensing magnet is disc-shaped and has its upper end a North pole and the other end a South pole. A ring magnet is placed around the tube and below the sensing magnet with the North pole on the upper face of the ring magnet being placed near the South pole of the sensing magnet. A second ring magnet is placed around the tube and above the sensing magnet with the South pole on the lower face of the ring magnet being placed near the North pole on the upper face of the sensing magnet.

When the sensing magnet was positioned between the two ring magnets there was a normal magnetic attraction between the lower South pole on the sensing magnet and the upper North pole on the lower ring magnet so that the lower ring magnet would be lifted when the sensing magnet moved upwardly. There was also a normal magnetic attraction between the upper North pole on the sensing magnet and the lower South pole on the upper ring magnet so that the upper ring magnet would be lowered when the sensing magnet moved downwardly.

In my abandoned case it was further disclosed that the sensing magnet had looped flux lines extending from the top North pole to the bottom South pole and likewise the two ring magnets had looped flux lines extending from the top North pole faces to the bottom South pole faces of the same ring magnet. If now the sensing magnet is moved upwardly toward the upper ring magnet, the upper portions of the looped flux lines from the sensing magnet would be compressed against the lower portions of the looped flux lines from the upper ring magnet. The tendency of the compressed flux line portions to assume natural loops creates a greater resisting force to keep the sensing magnet spaced from the ring magnet than is the normal magnetic attraction between the North pole on the upper surface of the sensing magnet and the South pole on the lower surface of the upper ring magnet. This resisting force due to the compressed flux lines trying to assume natural curved loops between the North and South poles of the same magnets is increased as the sensing magnet is moved nearer to the ring magnet.

I make use of this same phenomena in the present invention to cause a pivoted magnet, disposed exteriorly of the non-magnetic tube to snap into either one of two positions as the sensing magnet within the tube is moved with reference to the pivoted magnet in a predetermined manner. A holding magnet can be used for holding the pivoted magnet in either of its two positions into which it has been swung by the movement of the sensing magnet. One or more mercury switches or other types of switches can be mounted on the pivoted magnet and be swung into closed or open positions as the pivoted magnet is snapped into either of its two positions by the movement of the sensing magnet.

It is possible to mount several pivoted magnets along the tube and have them spaced from each other at predetermined distances. The sensing magnet can move along the interior of the tube and can actuate the pivoted magnets one after the other as the sensing magnet moves near enough to the pivoted magnets to cause them to snap into their other position. The pivoted magnets preferably are horse-shoe in shape so that they will encircle substantially one half the circumference of the tube. In addition the pivot points of the pivotal magnets can be moved toward or away from the tube axis and thus vary the magnetic attraction between the pivoted magnets and the sensing magnet.

It should be noted that if the North pole is on the upper face of the sensing magnet and the pivoted magnet also has its North pole on its upper face, then a snap action of the pivoted magnet will take place as the sensing magnet is moved thereby. On the other hand if the pivoted magnet is inverted with respect to the sensing magnet so that the North pole on the pivoted magnet is on its under surface and the North pole on the sensing magnet still remains on its upper surface, then the pivoted magnet will "track" the sensing magnet and will not snap into either one of its two positions as the sensing magnet is moved thereby. One or more pivoted magnets may be arranged along the exterior of the tube in inverted position so as to function as "tracking" magnets rather than operate with a snap action.

Other objects and advantages will appear in the following description and the novel features of the invention will be set forth in the appended claims.

Drawings

For a better understanding of my invention, reference should be had to the accompanying drawings, forming part of this specification, in which FIGURE 1 is a vertical section through the device, portions being shown in elevation, the device being actuated by a float. A snap action pivoted magnet is illustrated as well as a "tracking" pivoted magnet.

FIGURE 2 is a horizontal section through the device and is taken along the line II—II of FIGURE 1;

FIGURES 3 to 8 inclusive illustrate several different positions of the sensing magnet with relation to the pivoted magnet when the same poles of both magnets are oriented to extend in the same direction, and indicate the snap action of the pivoted magnet as it is swung into either one of its two positions; and FIGURES 9 and 10 illustrate two different positions of the sensing magnet and a pivoted magnet when the latter is inverted so that the same poles of both magnets extend in opposite directions. The pivoted magnet will now "track" the movements of the sensing magnet.

While I have shown only the preferred forms of my invention, it should be understood that various changes or modifications may be made within the scope of the annexed claims without departing from the spirit thereof.

Detailed description

Figure 3:
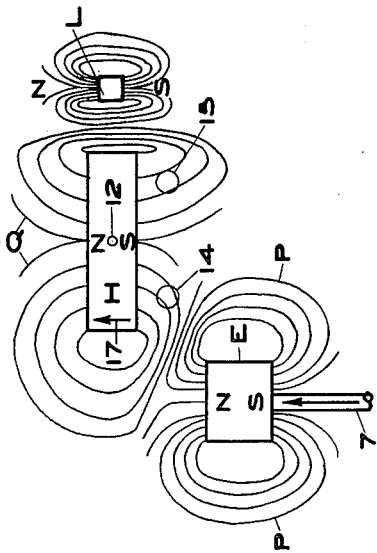

In carrying out my invention, I make use of a tank indicated generally at A, in FIGURE 1, and a float chamber B, that is in communication with the water in the tank by an upper interconnecting pipe 1, and a lower interconnecting pipe 2. The float chamber B, maintains the same water level 3 therein, that is in the tank A. The casing for the float chamber B, has a flange 4, at its upper end that is bolted or otherwise secured to an assembly base 5, that supports a non-magnetic tube C. The lower end of the tube C is sealed to the assembly base 5, and an opening in the base places the tube interior in communication with the interior of the float chamber B.

The top of the tube C, is closed at 6, and therefore, the steam pressures in the tank A, and float chamber B, will be retained in the closed tube C.

A float D, is placed in the float chamber B, and is buoyantly supported by the water or other fluid in the chamber so as to rise or fall with the rising or falling of the liquid level in the float chamber. A float-supporting stem 7, rises vertically from the top of the float D, and I mount a sensing magnet E, at the top of the stem. In actual practice, I place one or more disc-shaped magnets E on the stem 7, and the magnets have axial bores large enough to receive the stem. A plastic disc 8 is secured to the stem 7, and supports the lower magnetic disc E, and a second plastic disc 9, is also secured to the stem and bears against the upper magnetic disc E. The two discs 8 and 9, act like pistons as they slide along the interior surface and the tube C, and they guide the magnetic discs E.

Each disc E has a North pole on its entire upper face and a South pole on its entire lower face. The two discs E, therefore function as a single magnet with its top face functioning as a North pole and its bottom face functioning as a South pole. The float D provides only one means for reciprocating the stem 7 and inner magnet E, within the tube C, and is illustrated by way of example. The tube C, and stem 7, may be any length desired and the stem may be reciprocated by any means desired.

Snap switch

I will now describe the construction of the snap switch and then will explain the theory of its operation. The snap switch is illustrated in FIGURES 1 and 2. A base member F, in the form of a collar is adjustably secured to the exterior surface of the tube C, and is placed at a desired position on the tube. The base member F, has a pair of uprights 10, that have their lower ends pivoted to the base at 11. A magnet-carrying member G, is pivotally connected at 12, to the upper ends of the uprights 10. FIGURE 2 shows the magnet-carrying member G, provided with a recess 13, that is adapted to receive a portion of the tube C.

The lower pivot points 11, exert sufficient friction on the uprights 10, to hold them in any position into which they are swung. The upper pivot points 12, freely support the magnet-carrying member G, and permit the free swinging of the member into either one of its two extreme positions. In fact, the horizontal position of the member G, illustrated in FIGURE 1, is not the normal position. A magnet H, is mounted in the member G, and the magnet has a recess at its left hand end when viewing FIGURE 1, that substantially coincides with the contour of the recess 13. The uprights 10, can be swung toward or away from the tube C, and will move the member G, and magnet H, toward or away from the tube. The purpose of this is to position the magnet H, at the proper place with respect to the tube C, so that the magnet will be attracted by the sensing magnet E, as the latter is moved along the interior of the tube and past the magnet H.

The upper surface of the magnet H, is a North pole while the lower surface of the same magnet is a South pole. A mercury switch J, is mounted on the member G, and is designed to close when the member is in one of its extreme positions and to open when the member is in the other of its extreme position. Adjustable set screws 14 and 15, are carried by the base member F, and can be adjusted for limiting the two extreme positions into which the member G, can be swung. In addition to this, I provide a locking magnet holder K, that projects upwardly from the base F. A locking magnet L, is mounted in the holder K, and is positioned near the magnet H, that pivots when the member G, pivots. I will therefore refer to the magnet H, as the pivoting magnet. The locking magnet L, has its upper surface a North pole and its lower surface a South pole. The locking magnet does away with the necessity of providing a spring for holding the member G in either of its two positions.

The base member F, also carries a depending terminal block M, see FIGURE 1. Flexible wires 16, lead from terminal connections on the mercury switch J, to binding posts on the terminal block M. From here, wires not shown, lead from the binding posts on the terminal block, to any electrical unit, not shown, that are designed to be operated by the closing and opening of the mercury switch J, as the member G, is swung into either one of its two extreme positions. It is possible to have more than one mercury switch J, mounted on the member G, or any other type of switch could be used. In fact the swinging movement of the member G, can be utilized for doing any type work desired. The novelty of the member G, is the snap action imparted to it as the sensing magnet E, moves past the pivoted magnet H.

Operation of snap action member

The snap action member is the magnet-carrying member G. In FIGURES 3 to 8 inclusive, I illustrate the theory of magnet action in terms of fields of flux that causes the pivoted magnet H, to snap into either one of two extreme positions as the sensing magnet E, moves thereby. The non-magnetic tube C, is not illustrated in these figures and only the pivot point 12 for the magnet H, is indicated.

As the float D, rises and falls, the stem 7, moves the inner magnet E. FIGURES 3 to 8 inclusive indicate what takes place as the inner magnet E, moves upwardly past the pivoted magnet H, when similar poles in the two magnets extend in the same direction. A snap action of the pivoted magnet H, results. As the magnet E is raised, but is not brought close to the pivoted magnet H, the flux fields P, around the inner magnet E, and the flux fields Q, around the pivoted magnet H, are as shown in FIGURE 3. At this point there is little effect between the magnets E and H, the effect being limited to a very slight attraction between the North pole on the top of the inner magnet E, and the South pole on the bottom of the pivoted magnet H. Note that magnet H, is pivoted at point 12. The two flux fields P, and Q, will not interfere with each other.

Figure 4:
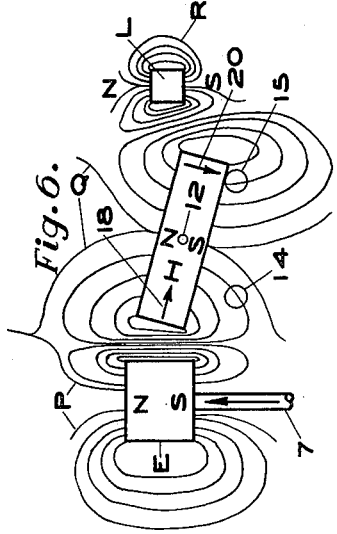
Figure 5:
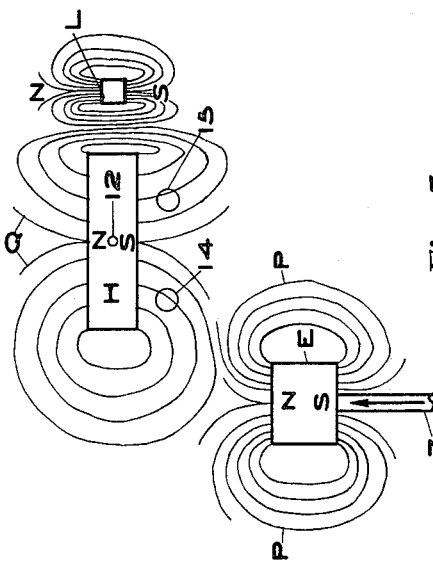

In FIGURE 4, let us assume that momentarily, the magnet H, is being held in a horizontal position and is prevented from swinging about the pivot point 12. As the sensing magnet E moves upwardly from the position shown in FIGURE 3, into that shown in FIGURE 4, the flux lines in the circular fields P, and Q, begin to be somewhat warped by their mutual interference, and the compressing of the two fields in the narrowed space between the two magnets E, and H, will exert an upward flux on the left hand end of pivotal magnet H, as shown by the arrow 17 in FIGURE 4. If at this moment, the pivoted magnet H, is released, it will immediately swing in a clockwise direction about the pivot 12, as shown in FIGURE 5. The set screw 15, shown as a small circle in FIGURE 5, will stop further clockwise rotation of the pivoted magnet H, when the latter has moved into the position indicated in this figure. Note that the arrow 17 in FIGURE 5, is still pointing upward, indicating the upward thrust exerted on the left hand end of pivoted magnet H, due to the compression of the two flux fields P, and Q, at the point where the two magnets are closest to each other.

Figure 6:
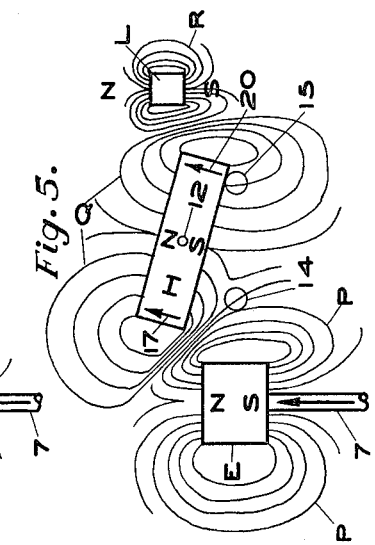

In FIGURE 6, the inner sensing magnet E, has continued to move upwardly and now has produced field warpage between the flux fields P, and Q, in such a way that the thrust on the pivoted magnet H, will be in a direction pointing toward the pivoted axis 12, as indicated by the arrow 18, in this figure. In other words a condition of near balance exists on the pivoted magnet H.

As the inner sensing magnet E, continues to rise an infinitesimal distance from the position shown in FIGURE 6, into the one shown in FIGURE 7, the balance of forces is upset to produce a downward thrust on the left hand end of the pivoted magnet H, as shown by the overlapping flux fields P, and Q, and the downward pointing arrow 19, placed at the left hand end of magnet H. The pivoted magnet H, will not remain in the position shown in FIGURE 7, when the compressed flux fields P, and Q, between the two magnets are such as to exert a downward thrust at the left hand end of the magnet H, and indicated by the arrow 19, but will immediately snap into the position shown in FIGURE 8.

The downward thrust on the pivoted magnet H, in FIGURE 8, as indicated by the arrow 19, and caused by the compressed portions of the flux fields P, and Q, is greater than the magnetic attracting force between the South pole of the sensing magnet E, and the North pole of the pivoted magnet H. The set screw 14 of FIGURE 1, is shown as a small circle in FIGURE 8, and constitutes a stop for preventing any further counter-clockwise rotation of the pivoted magnet H.

The locking or holding magnet L, is placed near the pivoted magnet H, see FIGURE 1, and will function to retain the pivoted magnet in either of its two extreme positions. The holding magnet L, is a fixed magnet with a polarity oriented the same as that of the pivoted magnet H. The holding magnet L, is also indicated in FIGURES 5 to 8, inclusive and the top of the magnet is a North pole and the bottom is a South pole. If the poles of the sensing magnet E, and the pivoted magnet H, were reversed, the poles of the holding magnet L, would likewise be reversed.

The flux field Q, at the right hand end of the pivoted magnet H, has a portion compressed by the flux field R, emanating from the holding magnet L, see FIGURE 5. The tendency of the compressed flux lines in these two fields to try and assume their natural curves between their North and South poles creates a greater force tending to move the right hand end of the magnet H, downwardly, as indicated by the arrow 20, in FIGURE 5, than there is the attracting force between the North pole of the pivoted magnet H, and the South pole of the holding magnet L. In fact the downward force shown by the arrow 20, in FIGURE 5, cooperates with the upward force exerted by the arrow 17, in the same figure in rotating the pivoted magnet in a clockwise direction about its pivot 12.

The same downward force is exerted by the compressed portions of the two flux fields Q, and R, in FIGURE 6, and the arrow 20, indicates this downward force even though the sensing magnet E, has moved upwardly from the position shown in FIGURE 5, and the compressed portions of the two flux fields P, and Q, create a balanced force as indicated by the arrow 18, in FIGURE 6. Even in FIGURE 7, there is still the downward force at the right hand end of the pivoted magnet H, as shown by the arrow 20. However, the sensing magnet E, has now moved upwardly to a point where the two flux fields P and Q, will have their compressed portions exert the downward force at the left hand end of the pivoted magnet H, and the downward force shown by the arrow 19, is greater than the downward force indicated by the arrow 20. The result is a snap action of the pivoted magnet H, as it swings in a counterclockwise direction in FIGURE 8, and the two flux fields Q, and R, will alter the mutually compressed portions so that the force exerted at the right hand end to the pivoted magnet H, will be in an upward direction as shown by the arrow 21. The holding magnet L, will now hold the pivoted magnet H, in the position shown in FIGURE 8.

The same operation will take place if another base member F, and its associate parts as already mentioned, were placed at a higher position on the tube C. The continued upward movement of the sensing magnet E, past the pivoted magnet H, of the higher base member F, would cause the same snap action movement of the pivoted magnet as already explained. In fact as many additional base members F, and associate parts could be placed along the tube C, and the same sensing magnet E, could move past all of them and the pivoted magnet H, in each would operate with a snap action.

The return downward movement of the sensing magnet E, would cause the pivoted magnet H, to operate in a reverse manner to that already explained for the upward movement of the magnet E. The magnet H, would have a snap action as it moved from one extreme position to the other. It is not necessary to give a detailed account of the return downward movement of the magnet E, and how it acts on the pivoted magnet H.

*Tracking switch*

I will now describe how the pivoted magnet H, can be inverted so that the North pole will be at its lower surface and the South pole will be at its upper surface. The poles on the sensing magnet E, will not be reversed. The parts forming the tracking switch are identical to the parts forming the snap switch except that the locking or holding magnet L, and its holder K, need not be used. The locking magnet L, not shown for base F' in FIGURE 1, can be used.

The tracking switch is shown in FIGURE 1, as being mounted on the non-magnetic tube C, at a higher point than the snap switch which has already been described in detail. Corresponding parts in the tracking switch are given the same letters and reference numerals as are given the snap switch excepting that the letters and numbers for the tracking switch will be primed.

The theory that shows the operation of the tracking switch is illustrated in FIGURES 9 and 10. In both figures, the poles of the pivoted magnet H' have been reversed so that unlike poles are presented upward by the sensing magnet E, and the pivoted magnet H'. The sensing magnet E, will have the flux field P, and the portion of the flux field that lies between the two magnets E and H', will combine with the similar portion of the flux field Q', emanating from the pivoted magnet H'. There will be natural curved flux lines extending from the top North pole of the sensing magnet E, to the top South pole of the pivoted magnet H'. Also there will be natural curved flux lines extending from the bottom North pole of the pivoted magnet H', to the bottom South pole of the sensing magnet E.

The result will be a magnetic attraction between the sensing magnet E, and the pivoted magnet H', and the left hand end of the pivoted magnet will be raised when the sensing magnet E, is raised, and will be lowered when the sensing magnet E, is lowered. In FIGURE 10, I show the sensing magnet E, raised from the position shown in FIGURE 9, and the pivoted magnet H', has been swung clockwise about its pivot 12'. The reverse would be true if the sensing magnet were moved downwardly. In this way the pivoted magnet H', "tracks" the sensing magnet E.

A mercury switch J' can be operated by the movement of the pivoted magnet H', to open or close an electric circuit. More than one mercury switch could thus be actuated or a different type of switch could be operated. It is possible to have the tracking movement of the pivoted magnet H', operate a mechanical movement, not shown. The movement of magnet H', is gradual and not a snap action, and it will be matched exactly by the vertical movement of the magnet E.

Each of these types of movement of the magnets H, and H' has its particular application. The snap action of the magnet H, would be most widely used and most widely applicable, while the tracking action of the magnet H', could be useful in regulating air pilots, not shown, and for certain switching functions such as a high water alarm which does not require a snap action. The mechanism illustrated in FIGURE 1, and consisting of the movable sensing magnet E in the non-magnetic tube C, the magnet H in its pivoted holder G, and the mercury switch operated by the holder or magnet-carrying member G, comprises a control mechanism that has an unlimited number of uses. The magnetic poles on the magnets H, or H', are oriented to the axis of the tube C.

I claim:

1. In a control mechanism: a non-magnetic tube; a magnet-holding member having a fixed pivotal axis that is transverse to the tube axis; a first magnet carried by the member and placed near the tube exterior and having its poles oriented with respect to the tube axis so that the axis of polarity of both poles is parallel to the axis of the tube; a second magnet slidable within the tube and having its poles paralleling the tube axis; like poles on the two magnets extending substantially in the same direction; said second magnet being movable along the tube toward the first magnet and having a flux field that will tend to overlap the flux field of the first magnet as the two magnets near each other, means for causing the overlapping portions of the two flux fields to be compressed as the second magnet approaches the first magnet, said means comprising two stop means for limiting the swinging of the pivotal member between two extreme positions; the compressed flux fields creating a greater force, tending to move the adjacent end of the first magnet away from the second magnet and hold the member in one of its extreme positions against one of the stop means as the second magnet moves toward the first magnet, than is created by the natural magnetic force of the opposite poles of the two magnets to attract each other; the force created by the compressed flux fields in maintaining the first magnet and its holding member in one extreme position, being suddenly reversed when the second magnet starts to pass the first magnet, the overlapping or compressed flux fields exerting a force to swing the first magnet and member with a snap action into its other extreme position against the other stop means because the portions of the flux fields of the first and second magnets that have been compressed in the restricted space provided between the magnets as the second magnet passes the first one are suddenly free to expand into the enlarged space just above the first magnet and will react suddenly on each other to swing said first magnet against said other stop.

2. The combination as set forth in claim 1 in which the first magnet and its holding member may be moved toward or away from the tube axis for varying the magnetic attraction between the first and second magnets.

3. In a control mechanism: a first magnet rockable about an axis; a second magnet having an axis that extends substantially at right angles to and passes near the axis of said first magnet; said second magnet being movable along its axis from a position on one side of said first magnet to a position on the other side; the poles of both magnets lying on the axes of the magnets, the axes of the two magnets paralleling each other when the magnets are disposed closest together and the poles of like polarity of the two magnets extend in the same direction; the space between the two magnets when the second magnet is closest to the first one being restricted so as to compress portions of the two magnetic fields of both magnets that extend through this restricted space; means for using the repelling force created by the compressing of portions of the two magnetic fields between the two magnets as the second magnet is moved along its axis toward the first, this repelling force being exerted against the side of the first magnet disposed nearest to the second magnet to cause said side to swing away from said second magnet and rock said first magnet on its axis; a stop for limiting the rocking movement of said first magnet; said second magnet when moved past said first magnet a slight distance moving the magnetic field of the second magnet to a point where the compressed portions of both magnetic fields will flow rapidly through the enlarged restricted space and will rapidly expand on the other side of said first magnet to create a counter force on the magnetic field of the first magnet to swing said first magnet in an opposite direction to its first swinging movement; and a second stop for limiting the rocking movement of the first magnet in the opposite direction.

4. The combination as set forth in claim 3 in which a holding magnet is disposed near to said first magnet and on the opposite side from said second magnet; the poles of said holding magnet lying on the axis of said magnet and the axis of the holding magnet paralleling the axis of said second magnet with the poles of like polarity of the second and holding magnets extending in the same direction; the space between the holding magnet and the adjacent side of said first magnet being restricted to compress the portions of the two magnetic fields of these magnets that lie in this space; whereby the compressed portions of the fields of the holding and first magnets will react to tend to hold the first magnet in either one of its two positions into which it has been rotated by the movement of the second magnet with respect to said first magnet.

References Cited by the Examiner

UNITED STATES PATENTS

| 2,425,691 | 8/47 | Brewer | 73—290.1 |
| 2,634,608 | 4/53 | Sorber | 73—305 |
| 2,850,686 | 9/58 | Macgeorge | 317—171 |

JOHN F. BURNS, *Primary Examiner.*

SAMUEL BERNSTEIN, E. JAMES SAX, *Examiners.*